United States Patent [19]

Wroblewski

[11] Patent Number: 4,874,080
[45] Date of Patent: Oct. 17, 1989

[54] CONVEYOR

[76] Inventor: Lucien J. Wroblewski, 16 W. 171 Shore Ct., Hinsdale, Ill. 60521

[21] Appl. No.: 205,379

[22] Filed: Jun. 10, 1988

[51] Int. Cl.[4] .............................................. B65G 37/00
[52] U.S. Cl. ................................. 198/463.6; 198/836; 221/298
[58] Field of Search ...................... 198/817, 836, 463.3, 198/463.4, 463.6, 793; 414/330, 748, 910; 221/298, 296

[56] References Cited

U.S. PATENT DOCUMENTS

| 2,432,024 | 12/1947 | Lipton | 198/793 |
|---|---|---|---|
| 3,001,636 | 9/1961 | Klapes | 198/836 |
| 3,965,523 | 6/1976 | Elliott | 198/817 X |
| 4,163,491 | 8/1979 | Rock et al. | 198/836 |
| 4,279,338 | 7/1981 | Sekora | 198/836 X |
| 4,631,812 | 12/1986 | Young | 198/836 X |

FOREIGN PATENT DOCUMENTS

| 1244652 | 7/1967 | Fed. Rep. of Germany | 198/836 |
|---|---|---|---|
| 37615 | 2/1986 | Japan | 198/463.6 |
| 2130920 | 6/1987 | Japan | 198/463.6 |

OTHER PUBLICATIONS

Sales Catalog Entitled "Automation Components for Handling and Assembly", Jergens/NKE, Cleveland, Ohio, date unknown, pp. 88–103.

Primary Examiner—Robert J. Spar
Assistant Examiner—James R. Bidwell
Attorney, Agent, or Firm—Hill, Van Santen, Steadman & Simpson

[57] ABSTRACT

A device for conveying a plurality of parts in a desired orientation in a single line as they are received from an aligning device to an exit position where they are picked up by a transfer device for further assembly or handling. The device uses a pair of belts, which are spaced apart, for conveying the part in the line to a stop at the exit position and has an escapement arrangement for holding the line of parts away from the part at the exit position and allowing a single part to advance to the exit position after a part at the exit position has been removed therefrom. The device includes adjusting the amount of contact between each of the belts and the edges of the parts to limit the amount of force being applied to the parts during transfer to prevent distortion of flexible parts and/or prevent the parts from riding up over each other adjacent the escapement arrangement.

19 Claims, 5 Drawing Sheets

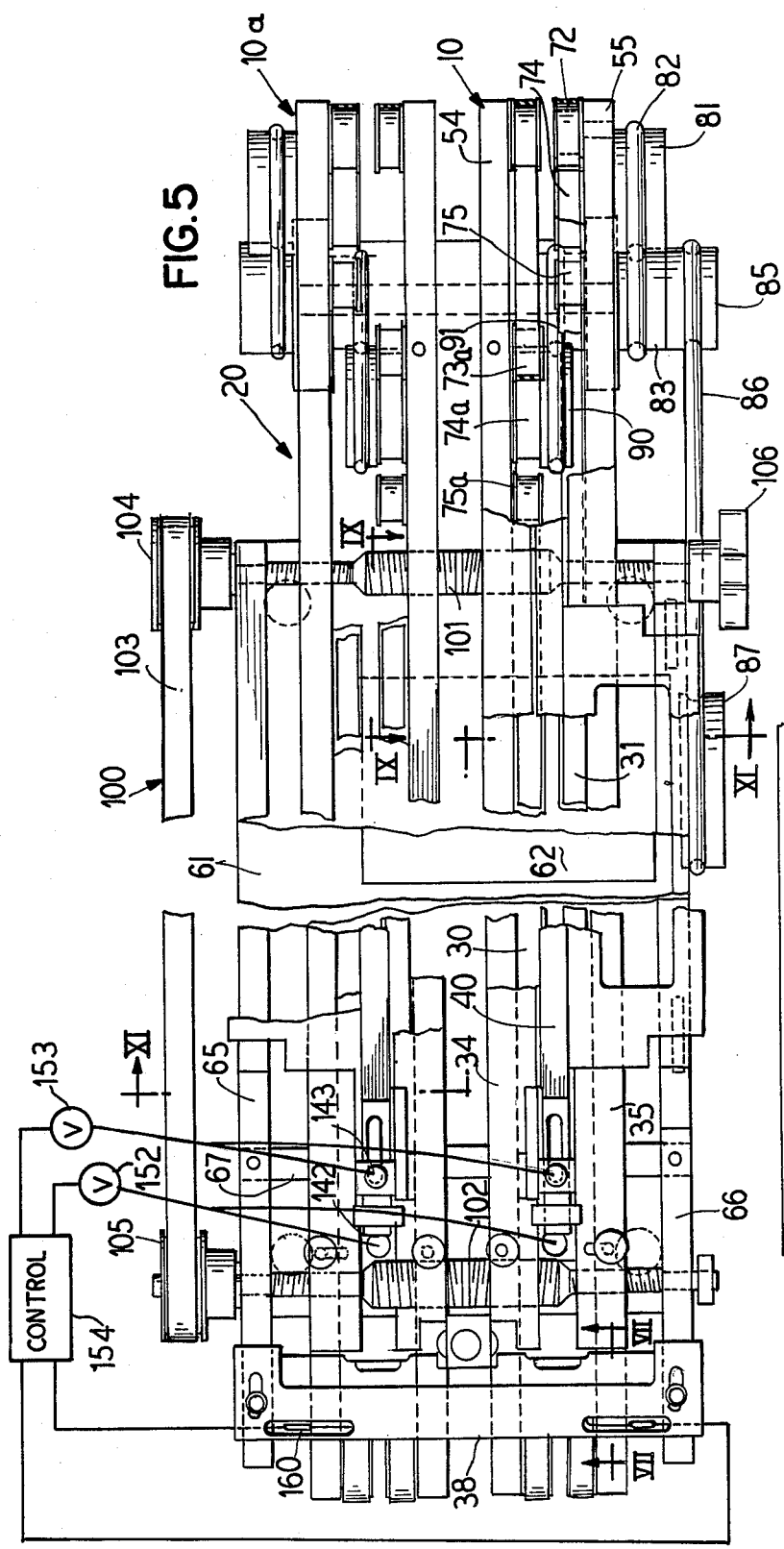

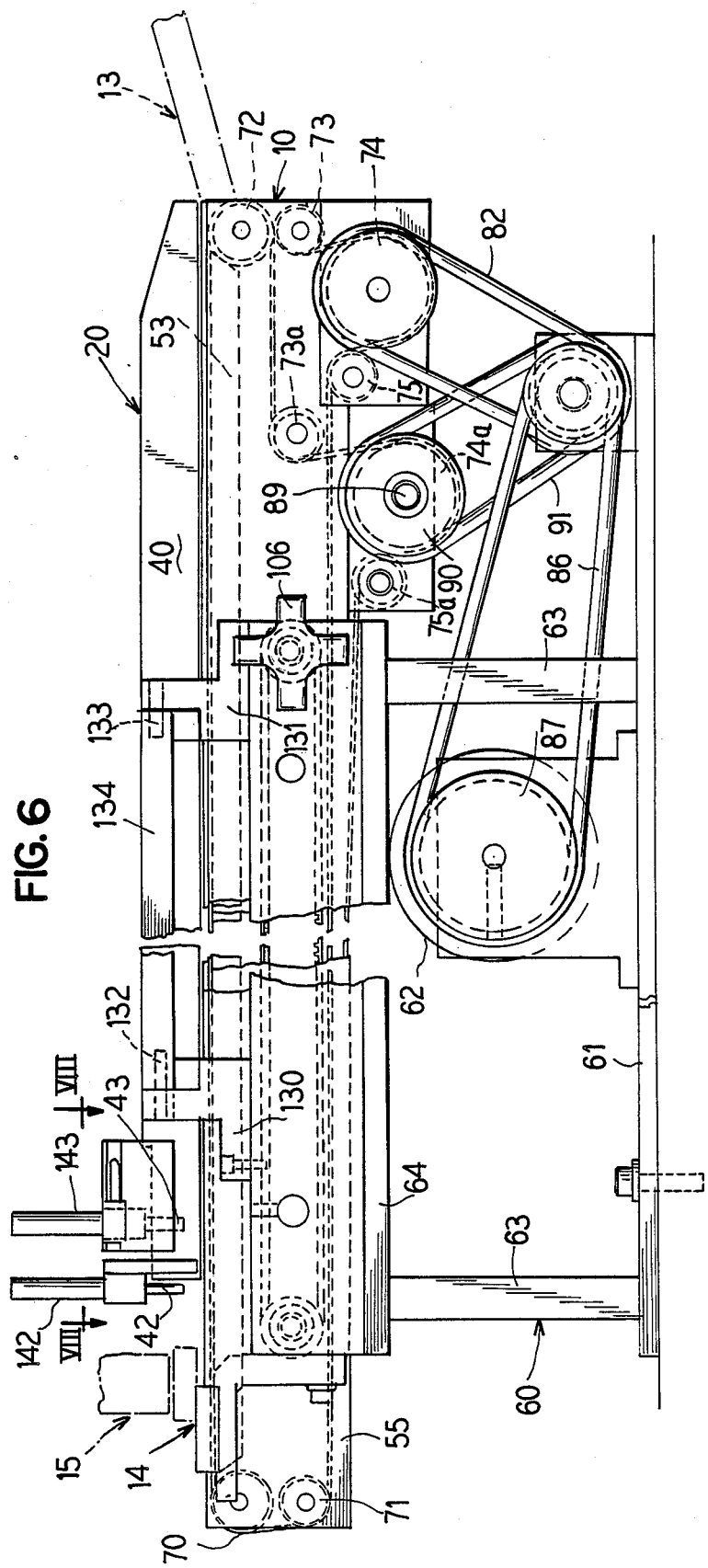

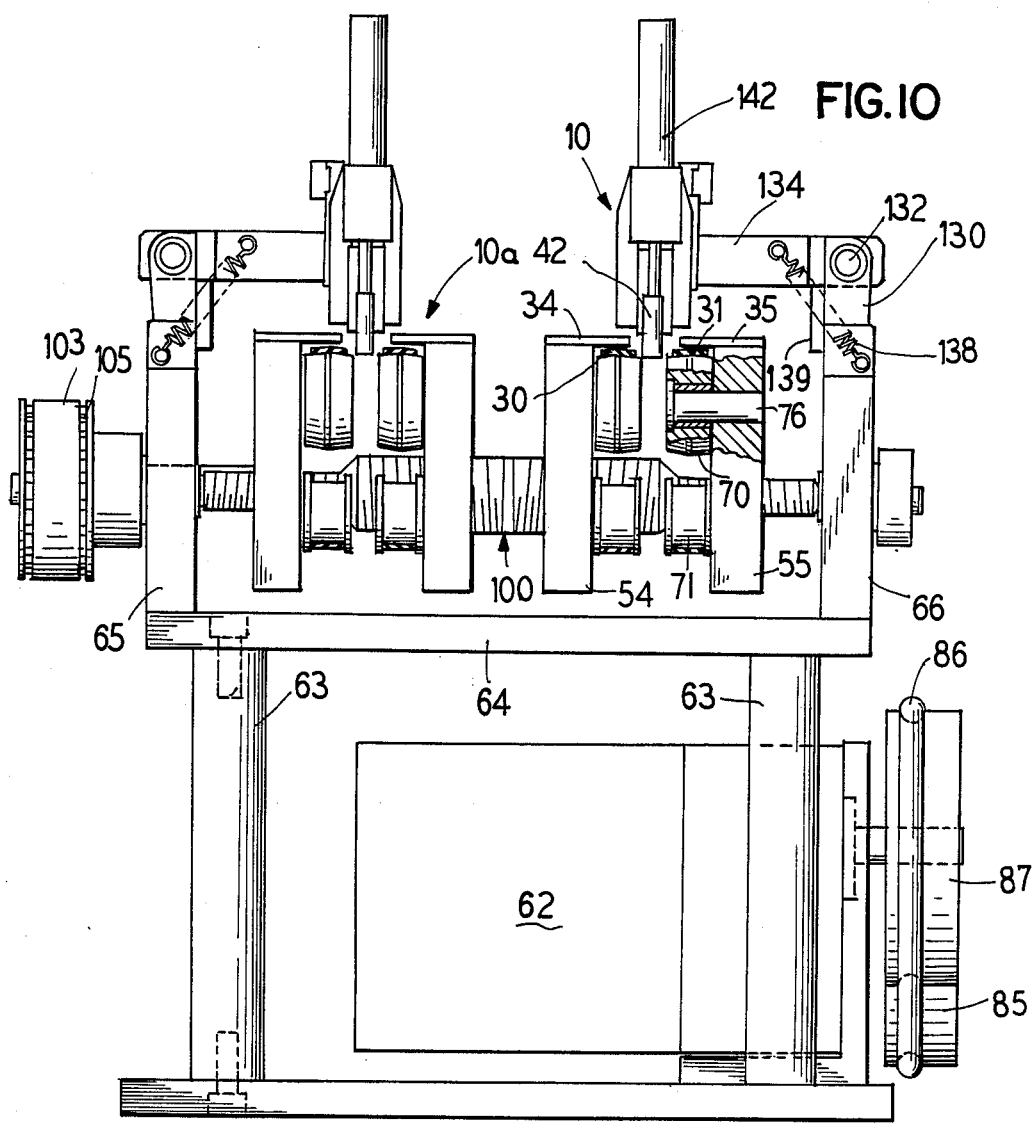
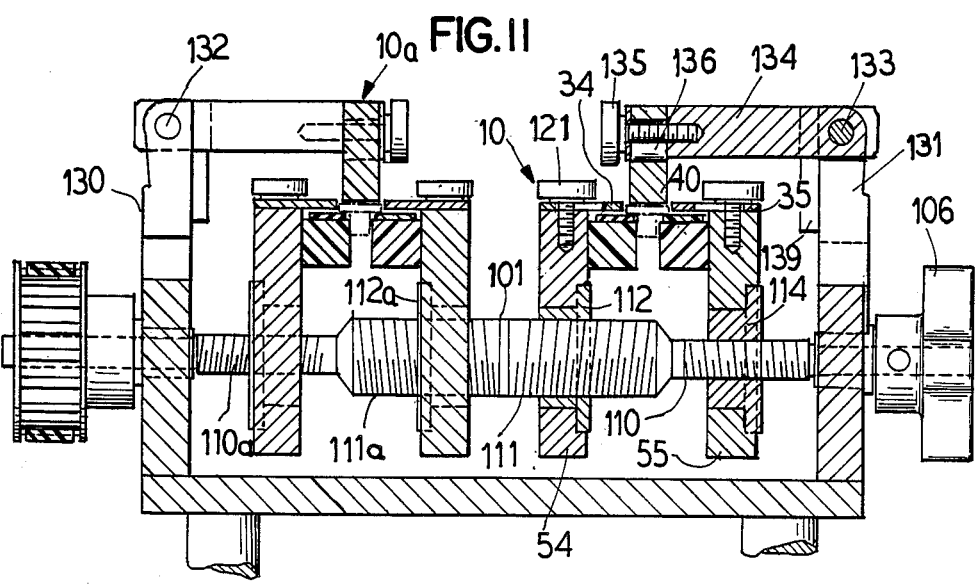

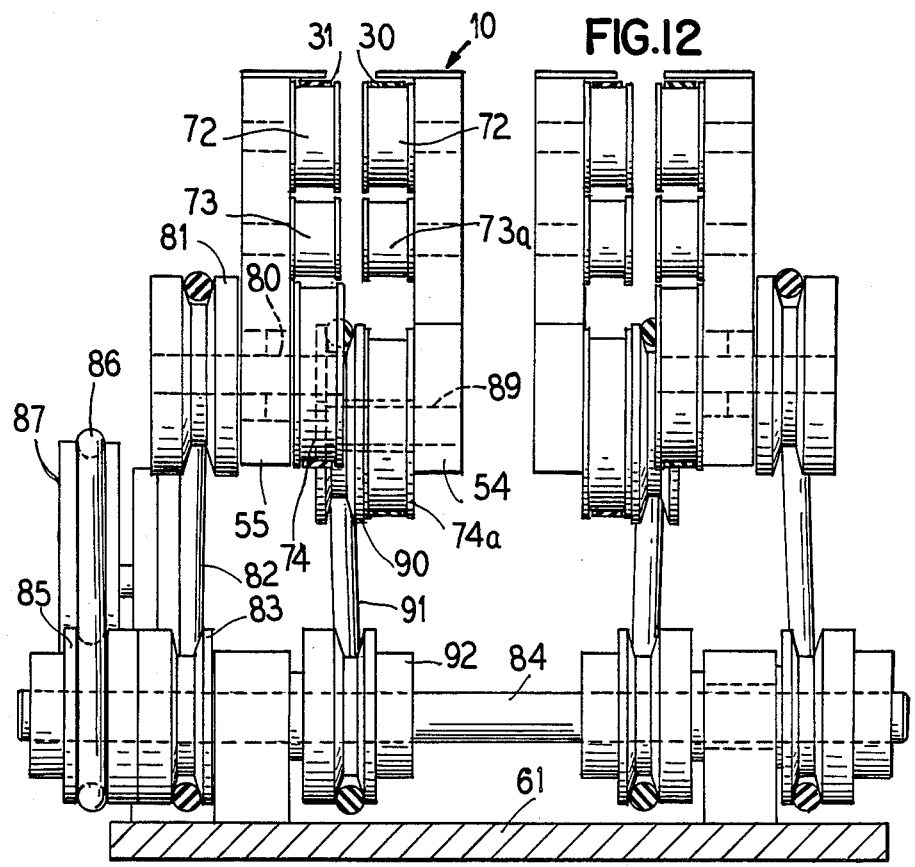
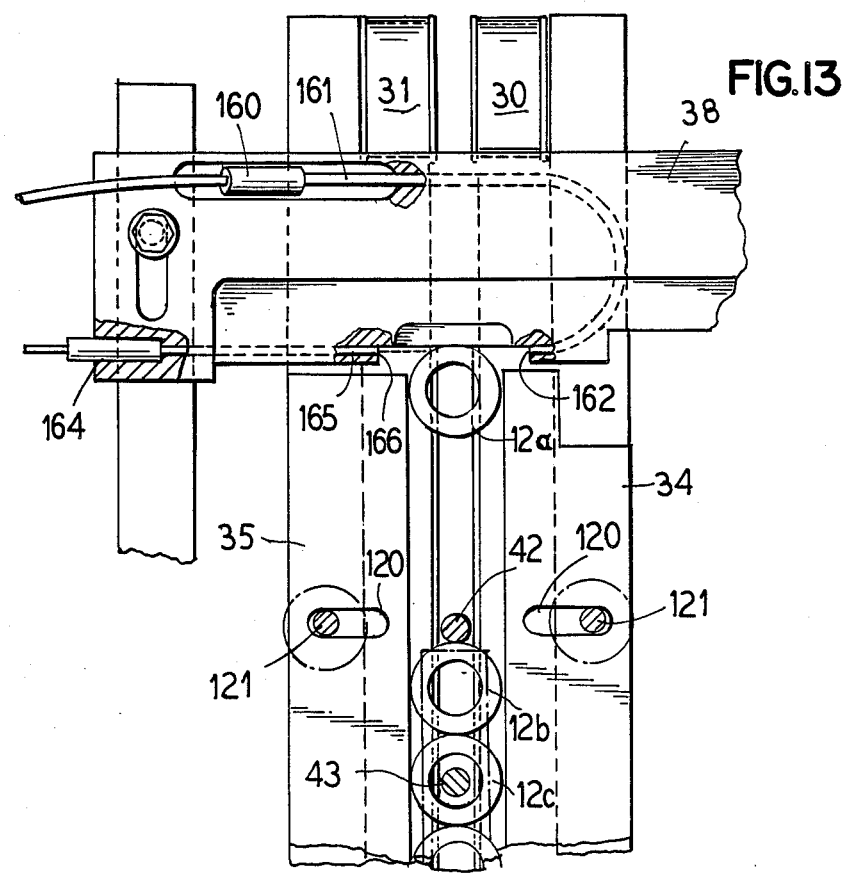

CONVEYOR

BACKGROUND OF THE INVENTION

The present invention is directed to a conveyor device which receives parts in a desired orientation and conveys a line of these parts to a discharge position where an element of an assembly device will pick up a part to transport it to a point for further assembly.

In order to obtain a line of parts arranged in the desired orientation, vibratory bowls have been used to sort a bulk grouping of produce and to create a line or single file of the parts of a specific orientation. The transport of these parts in the specific orientation from the vibratory bowl to a processing station, which may be a pick & place or other type of escapement, has been met by utilizing either a flat conveyor or a linear vibratory transport system. Neither of these devices have ever had the capability of being easily adjustable to accommodate different part configurations, which are becoming more prominent in automated assembly machines. For example, when utilizing a linear vibratory transport system, a change in the size or shape of the part being conveyed in a single file will change the weight distribution on the vibratory conveyor, which may cause a detuning of the conveyor. In addition, the use of hold-down bars with a vibratory conveyor, to insure that you only have a single layer of parts being conveyed, is extremely difficult because the vibratory conveyor must oscillate over a given vertical distance, which changes with the change of weight in the parts being conveyed.

Another problem with existing conveying devices is the conveying of light-weight flexible parts, such as annular seals, and O-rings. While conveying these in single file and restraining the leading part in the file while picking a part from the exit station, the combined transporting forces on the elements of the file can cause the leading elements to buckle and/or collapse, due to the combined sum of the forces on the individual parts of each element in the line of file.

Thus, it would be desirable to have a device which would allow adjusting the amount of force applied to each part in a line of file so that the sum total of forces for transporting the elements or parts would not cause a collapsing of the lead part when the movement of the file is being restrained while forming a pick & place operation.

SUMMARY OF THE INVENTION

The object of the present invention is to provide a device for conveying articles from an input end, which receives the articles in a single file in the desired orientation from a device, such as a vibratory bowl feed, and conveys these parts in single file to a delivery spot, where the movement of the file is restrained as a single part at a discharge station is removed by a pick-up device or element.

The device of the present invention provides simple adjustment when changing the size of the parts being conveyed, provides a simple adjustment of the amount of transporting force applied to each of the articles so that when fragile, flexible, small articles are being conveyed, they will not be damaged or collapsed by a combined force of the sum of the forces applied to the elements in the single file and allows a positioning of the last article at a placement station for being retrieved or grasped by a transport element.

To accomplish these goals, the present invention is directed to a device for conveying articles from an input end to an output end as a continuous, orientated column or single file of articles, said device comprising a main frame, at least one pair of continuous belts having contact surfaces, first means for mounting said pair of belts in the frame with an adjustable spacing therebetween and relative to a center line, drive means for driving the belts at a continuous speed, second means for guiding articles being carried by said pair of belts along the center line and for controlling the amount of conveying force transferred between the pair of belts to each article, third means for holding the article in a single layer in the single file on the pair of belts, fourth means for holding an article at the exit end in an exit position, and fifth means for releasing the leading article in the single file one at a time from the line of file to be carried by the belts to the exit position while retaining the remaining articles in the line of file during the releasing step.

The first means includes double-screws, which automatically move the two conveyor belts relative to a center line to change the spacing between the belts and from the edges of the belts to the center line between the two belts. In this device, the belts are constantly positioned the same distance between the center line so that the part being conveyed on the pair of belts will have the center of the part lying in the plane of the center line for the pair of belts.

The second means for guiding the articles also acts as the means for controlling the amount of force. This second means includes a pair of guide members, which are positioned to extend over the belt and are adjustable to the belt, to limit the amount of lateral surface of the belt contacting each of the articles. Thus, by reducing the amount of contact between the surface of the belt and the article, the amount of frictional force for conveying the articles in the single file can be changed. When handling extremely light-weight and flexible articles, the positioning of the guide members relative to the surface of the belts of each pair enables selecting a desired amount of force to be transferred to each article so that the combined force of the forces transferred to each of the articles in the single file will not be sufficient to cause a collapsing and/or buckling of the lead element in the file when the movement of the file is being restrained.

The third means for holding the articles in a single layer preferably comprises a hold-down bar, which is positioned over the center line between the pair of belts at a desired height, to provide a gap to allow one part to move therebeneath. This hold-down bar can also act as a mounting for the fifth means, which is an escapement device that allows releasing the leading article in the line while retaining the rest of the articles.

The fourth means for holding the article at the exit end comprises a stop member, which prevents further movement of the article on the belts. This stop member is preferably provided with a sensing device for sensing the presence of the article so that a command signal can be sent to the element for lifting the article from the stop or exit position for further processing. The escapement arrangement upstream from this stop member insures that the remaining portion of the line of file of parts do not contact a single part while it is in this exit position.

One of the many advantages of the present device is the fact of using two spaced conveyor, which support the edges of the article, and enables grasping an annular article having an axial hole by a device inserted into the axial hole or opening. In addition, the pair of spaced belts will act to convey a part, which is a bushing with a flange, with the bushing portion extending between the two belts as the edges of the flange are engaged by the pair of belts for transfer.

While the invention may utilize a single pair of belts, it can be built to have two or more pairs of belts arranged side-by-side. In such an arrangement, the adjustment mechanism for adjusting the spacing between the belts of each pair is built so that both pairs are adjusted at the same time to the same amount. In addition, the drive arrangement for the belts is such that it easily compensates for changes in the spacing between the belts without requiring changing the position of the drive pulleys.

Other advantages and features of the invention will be readily apparent from the following description of the preferred embodiments, the drawings and claims.

BRIEF DESCRIPTION OF THE DRAWINGS

FIG. 5 is a top view, with portions broken away, of a preferred embodiment of the conveyor device in accordance with the present invention;

FIG. 6 is a side view of the device of FIG. 5;

FIG. 7 is a cross sectional view taken along the lines VII—VII of FIG. 5;

FIG. 8 is a partial cross sectional view taken along the lines VIII—VIII of FIG. 6;

FIG. 9 is a partial cross sectional view taken along the lines IX—IX of FIG. 5;

FIG. 10 is a left end view of the device of FIG. 6, with portions removed for purposes of illustration;

FIG. 11 is a cross sectional view taken along the lines XI—XI of FIG. 5, with portions broken away for purposes of illustration;

FIG. 12 is a right end view of the device of FIG. 6; and

FIG. 13 is an enlarged partial plan view, with portions broken away for purposes of illustration, of the stop arrangement of FIG. 5.

DESCRIPTION OF THE PREFERRED EMBODIMENTS

The principles of the present invention are particularly useful when incorporated in a device, generally indicated at 10 in FIGS. 5 and 6, which has conveyor units 10 for conveying articles or parts 12 from an input station of the unit, which receives the parts as a single file line from a chute 13, which may be connected to an output of a part orienting device, such as a vibratory bowl and delivers them to an exit station, generally indicated at 14, to be grasped and picked up by an element, generally indicated at 15, for transferring the articles to a further assembly station.

Figure 1:
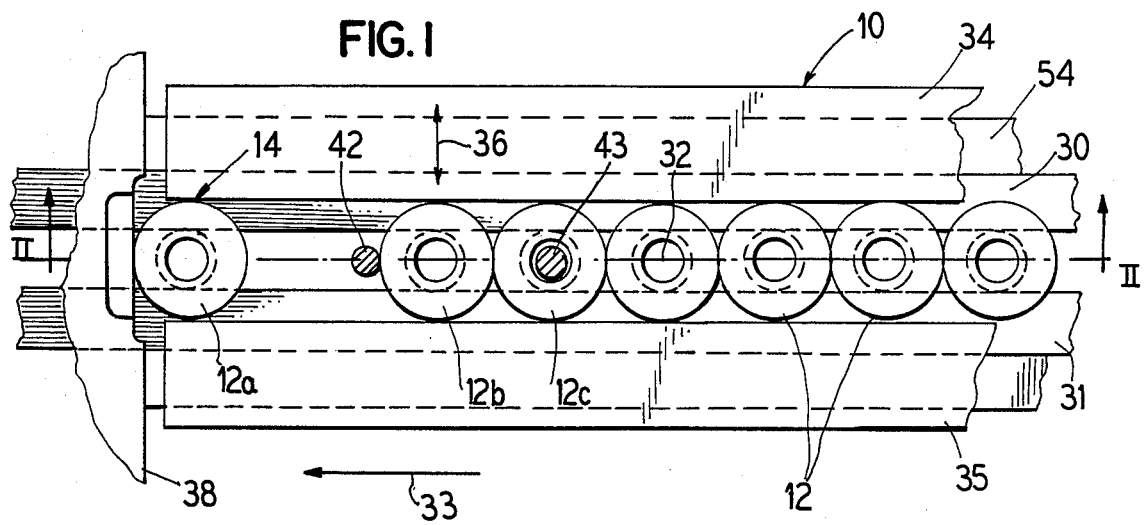
FIG. 1 is a diagrammatical plan view, with portions removed for purposes of illustration, of the conveying device according to the present invention.
Figure 2:
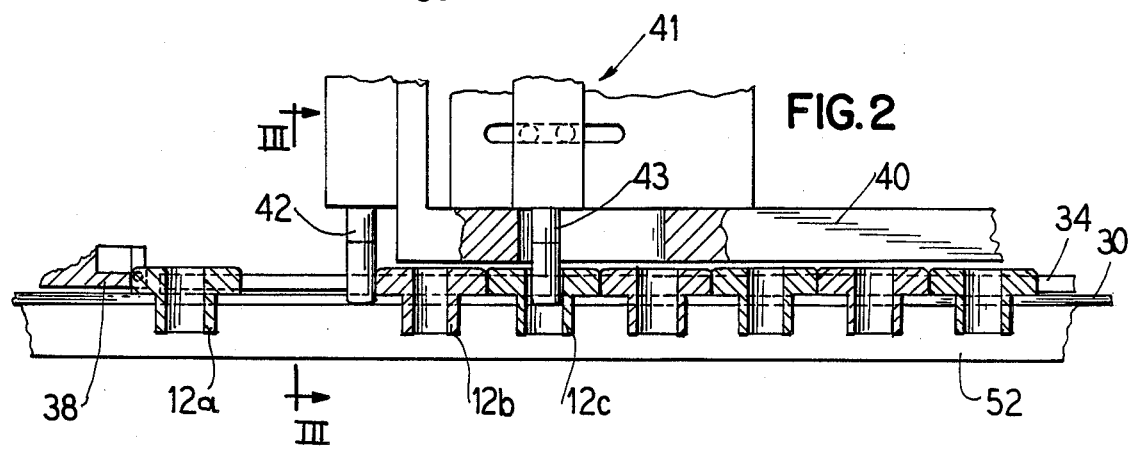
FIG. 2 is a diagrammatical cross sectional view taken along the lines II—II of FIG. 1.
Figure 3:
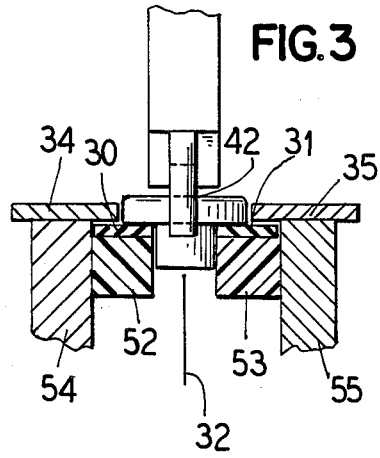
FIG. 3 is a cross sectional view taken along the lines III—III of FIG. 2.

As diagrammatically illustrated in FIGS. 1, 2 and 3, each unit 10 includes a pair of belts 30 and 31, which are equally spaced around a center line or plane 32 and are moving in a direction of arrow 33. The belts 30 and 31 each have a guide member 34 and 35, respectively, which is positioned to overlie an upper surface of each of the belts, so that only a portion of the belt's surfaces are engaged by the parts 12. As mentioned, the guide members 34 and 35 are mounted to be movable relative to the upper surface of the two belts in the transverse direction indicated by the double-arrow 36. As will be discussed hereinafter, the means for mounting the guide members 34 and 35 will also move them with the belts 30 and 31 when the spacing between the belts relative to the center line 32 is changed.

Another feature of the invention is the provision of a stop 38, which holds a leading part 12a in an exit position 14 for engagement by a transfer element 15 of FIG. 6.

Spaced above the belts, such as the belt 30 as illustrated in FIG. 2, is a hold-down bar or member 40, which insures that only a single layer of parts is conveyed by the belts in the line or column. At an end of the hold-down bar 40 adjacent the stop 38 is an escapement means, generally indicated at 41, which is illustrated as having a first plunger 42, and a second plunger 43. The first plunger 42 engages the first or leading part 12b in the single file of parts so that the part 12a, at the transfer station 14, will have no excessive pressures applied thereto during the transfer operation. While engaging the leading part 12b, the second plunger 43 engages the next part 12c of the line or file of parts.

In the position, as illustrated in FIGS. 1 and 2, the part 12a is at the discharge or unloading station 14, while the rest of the parts are in a single file on the conveyor belts 30 and 31. The plungers or pins 42 and 43 coact to hold the line of parts away from the part being transferred at the station 14. After the part 12a has been removed, a sensing arrangement in the stop 38, which will be discussed hereinafter, indicates the parts removal so that the plunger 42 can be withdrawn to allow the leading part 12b to be carried by the belts, which are continually moving into the transfer station 14. The plunger 43 prevents the next part 12c from moving with the part 12b. Either after a fixed time delay or after the sensing device indicates that the new part has arrived in the position on the unloading station 14, the plunger 42 will be returned to the position illustrated to block continued flow of any parts toward the station. The plunger 43 is then withdrawn to allow the next part 12c to assume the position of the part 12b. After a predetermined time delay, or by providing a sensor, the plunger 43 is again inserted to the position illustrated in FIG. 2 to engage the part assuming the position of the part 12c.

Because the belts 30 and 31 are continually moving, when the parts are restrained from moving with the belts, they must slip on the belts. When the plungers 42 and 43 are in the blocking mode, as illustrated in FIGS. 1 and 2, the string or line of parts 12, starting with the parts 12b, 12c, will slide on the surface of the belt until such time as the plunger is withdrawn to allow escapement of the part in the position 12b. As easily recognized, the part in the position of the part 12c will be subjected to a combined force of all of the frictional forces applied to the line of parts by the belts. When handling metal parts, such as illustrated in FIGS. 1, 2 and 3, a possible deforming of the parts will not occur.

However, the use of the retaining pins 42 and 43 prevent any undue forces from being applied to the part in the position 12a, which forces may interfere with the pickup and transfer of that part from that station.

Figure 4:
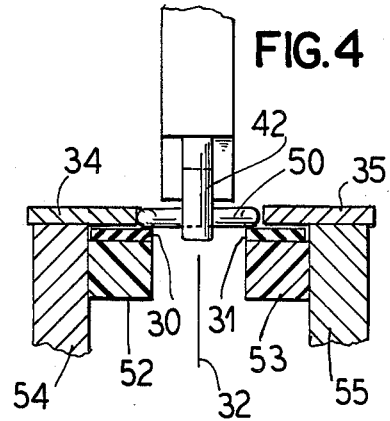
FIG. 4 is a cross sectional view taken along the lines III—III of FIG. 2 with the device handling a different type of part.

If the device is handling parts, such as the O-ring 50 of FIG. 4, then the flexible nature of the part is such that the combined forces on the part in the position 12c may be such to cause a collapse or deforming of the part. Also, the parts upstream of the part 12c may be subject to deformation due to the combined forces being applied. To overcome this problem, the guide members, such as 34 and 35, are adjusted relative to the belts 30 and 31 so that a reduced portion of the belt engages the article, such as the O-ring 50 as illustrated in FIG. 4. This reduces the amount of surface of the belts 30 and 31 engaging the O-ring and, thus, limits the amount of transfer of force from the belts to the O-rings. Thus, with proper adjustments, only a sufficient amount of force is applied to each O-ring to move the O-rings through the conveyor without providing an accumulated force on the single file of O-rings to cause buckling or deformation of the leading O-rings. It is noted that to reduce the amount of the surface of the belt engaged by the O-rings 50, each of the belts 30 and 31 were adjusted to have a greater degree of separation therebetween and spacing relative to the center line 32 than the belt spacing illustrated in FIG. 3. As mentioned before, one of the main features of the present invention is the fact that the two belts, when spaced apart, will be spaced relative to the center line by the means for adjustable mounting of the belts.

It should also be noted that in supporting each of the belts, such as 30 and 31, the belts pass over belt support members 52 and 53 (FIGS. 3 and 4), respectively, which are secured to belt frame portions or unit frame members 54 and 55, respectively, for each of the belts. Thus, when changing the lateral position of each of the belts, the frame portions 54 and 55, with their belt supports 52 and 53, respectively, move with each of the belts 30 and 31.

The device 20, as best illustrated in FIG. 5, has two conveyor units 10 and 10a, which each consists of a pair of belts 30 and 31. The device could be constructed with only a single conveyor unit 10 or could be constructed to provide more than two units, which are illustrated in FIG. 5.

As best illustrated in FIG. 6, the device 20 includes a frame 60, which has a base 61 that supports a drive motor 62. Disposed on the base 61 are a plurality of column-like elements 63 (FIGS. 6 and 10), which support a second elevated base 64 of the upper frame portion. As best illustrated in FIG. 10, the upper frame portion 64 has a pair of lateral side members 65 and 66 extending upwardly from the frame member 64. At least one cross member or rod, such as 67 (FIG. 5) extends between these side members 65 and 66.

As shown in FIG. 10, each of the conveyor units 10 and 10a are positioned between the side members 65 and 66. Each of these units has its own unit frame, which, as illustrated in FIGS. 3 and 4, includes a pair of side members 54 and 55, which have openings for sliding on the cross members 67 and receive an adjustment means for positioning each of the side members of the unit relative to the center line 32.

As illustrated in FIG. 10, each of the belts, such as the belt 30, is supported by pulleys on the side member 54, while the belt 31 is supported by pulleys on the side member 55. As illustrated in FIG. 6, the pulley arrangement for supporting is as follows. The member 55 on the left end has an upper pulley 70 and a lower pulley 71. On the right end, the member 55 has an upper pulley 72 and a lower pulley 73, a drive pulley 74 and a take-up pulley 75. As illustrated in FIG. 6, for the inner belt 30, a lower pulley 73a is spaced inward from the pulley 73, as is a drive pulley 74a and the take-up pulley 75a. Each of these pulleys, with the exception of the drive pulleys 74 and 74a, are mounted on a frictionless bearing supported on a pin, such as the pin 76 for the pulley 70 (FIG. 10). The belt support member, such as 53, extends between the upper pulley 70 and 72. The belt support member is made of a material with a low coefficient of friction, for example, a polyethylene of a high molecular weight. The belt is selected to be of a material having the desired coefficient of friction for conveying the articles and also to be resistant to whatever compounds and/or chemicals will be present or adjacent to this system. An example of a desirable material for the belt is a polyurethane belt.

To drive the belts, the drive pulleys 74 for the belt 31 is keyed to a shaft 80 (FIGS. 6 and 12), which also has keyed thereto a pulley 81 with a V-shaped groove, which receives a drive belt 82 extending to another V-shaped grooved pulley 83, which is keyed to a drive shaft 84. The shaft 84 is mounted on the base plate 61 for rotation and has a pulley 85 keyed thereto. The pulley 85 is driven by a drive belt 86, which extends to a drive pulley 87 connected to the shaft of the motor 62. To drive the belt 30, the drive pulley 74a is mounted for rotation on a shaft 89 and is connected to a pulley 90, which has a V-shaped groove that receives a drive belt 91 from a drive pulley 92 that is keyed onto the shaft 84. Thus, both drive pulleys 74 and 74a are driven in the same direction and at the same rate or speed. The belts 82 and 91 have a round cross section, which enables a lateral misalignment between the pulleys 81 and 83 and between the pulleys 90 and 92. Thus, while the pulleys 83 and 92 are rigidly fixed on the shaft 84 in a fixed position, the pulleys 81 and 90 move with their respective support plates 55 and 54. Thus, when the support plates are moved relatively apart, as described hereinabove with regard to FIG. 3, to adjust the spacing between the belts 30 and 31, the pulleys 81 and 90 are also moved relatively apart and this relative lateral movement is compensated by the round cross section of the drive belts 82 and 90, respectively. As illustrated, the second unit 10a is a mirror image of the unit 10. Thus, the belts 30 and 31 of the unit 10a will move at the same speed of advance as the belts 30 and 31 of the unit 10.

As mentioned before, the unit frames of each of the units 10 and 10a are mounted between the side members 65 and 66 and are moved laterally on cross members 67 (FIG. 5). In addition, an adjustment mechanism 100 is provided. The adjustment mechanism 100, as illustrated in FIG. 5, includes two screw arrangements 101 and 102, which extend parallel to each other and are interconnected by a tooth belt arrangement 103 that extends between a pulley 104 on the screw arrangement 101 and a pulley 105 on the screw arrangement 102. Thus, rotation of the screw 101 by a handle 106 causes both screws 101 and 102 to rotate the same amount and degree to cause a lateral shifting of each of the unit frame members in the same direction and the same amount.

The screws 101 and 102 are identical and the screw 101 is best illustrated in FIG. 11. The screw 101 has a small diameter threaded portion 110 and a large diameter portion 111 for the unit 10, while it has a large diameter portion 111a and a small diameter portion 110a for the unit 10a. The threads of the large diameter portion 111 and the small diameter portion 110 are opposite to each other. For example, threads 110 and 111a are illustrated as right hand threads and threads 111 and 110a are illustrated as left hand threads so that rotation in one direction, such as clockwise, of the handle 106 in FIG. 6 will cause the two plates 54 and 55 to move away from the center line and each other. A counter-clockwise rotation would cause the two plates to move towards each other.

In order to provide individual adjustment of each of the threads relative to its respective plate 54 and 55, the plate 54 has a threaded bushing 112 that cooperates with the threaded portion 111 and the plate 55 has a bushing 114 that cooperates with the threaded portion 110. Each of these threaded bushings, as illustrated in FIG. 9, for the bushing 112a can have their annular position adjusted in the member, such as 54a, to allow alignment and adjustment between the threaded elements. This annular position adjustment can be obtained by releasing a locking screw arrangement 114a and rotating the threaded bushing 112a by a tool engaging the bushing, such as a spanner wrench engaging openings 115a in the bushing.

Each of the guide elements, such as 34 and 35, are adjustably mounted on their respective frame members 54 and 55 of the unit, such as the unit 10, as illustrated in FIGS. 11 and 13. The guide elements have transversely extending slots 120, which receive threaded fasteners, such as 121, and allow lateral movement of each of the members 33 and 34 relative to the center line for the unit to change the amount of coverage of the belt surface.

As best illustrated in FIGS. 6 and 10 each of the side frames 65 and 66 has members 130 and 131 mounted thereon, such as by threaded fasteners. The members 130 have pins 132 and the members 131 have pins 133 which coact to support a plate member 134 for rotation. The hold-down bar 40 is secured on the plate 134 by screws 135 which extend through elongated slots 136. Thus, the hold-down bar 40, as illustrated in FIG. 11, can be vertically adjusted relative to the plane of the belts 30 and 31. As illustrated in FIG. 10, the member 134 is held in the horizontal position or downward horizontal position by a spring 138 holding the member 134 against a stop that is formed by a plate 139 that is attached to one of the members 130 or 131. When the plate 134 is pivoted from the position illustrated in FIG. 10 to an upright position, an over-center arrangement is obtained by the spring to hold the plate 134 in the vertical position against a second stop formed by the plate 139.

As mentioned hereinbefore, on the end of the hold-down bar 40 are a pair of piston rods 42 and 43, which are mounted in their respective cylinders for the purpose of preventing the movement of the parts past given positions or spaces. In the embodiment illustrated, in FIG. 6, the piston, rod or pin such as 42, is acutated by a cylinder, such as 142, while the piston rod or pin 43 is actuated by a cylinder 143. The cylinder 143, as best illustrated in FIG. 8, is mounted on a bar 40 with the pin 43 extending through a slot 144, which allows adjustment along the path of the pair of belts, depending on the size of the article 12 being transported. This adjustment is accomplished by an adjustment plate 145 attached on the side of the hold-down bar 40, which has an elongated slot which receives a member 146 that is held by threaded screws 147 to the base for the cylinder 143. Loosening the screws 147 allows the unit to be shifted in the slot 144 to the desired position.

The cylinders 142 and 143 are air-actuated units, which are provided with control valves with a control valve (FIG. 5) diagrammatically illustrated at 152 for the piston 142 and valve 153 for the piston 143. The operation of the valves 152 and 153 is by a control unit 154, which receives an input from a sensor, such as 160.

In the embodiment illustrated in FIG. 5 and illustrated in greater detail in FIGS. 7 and 13, the sensor 160 is an optical sensor having an optical fiber or waveguide 161 which curves around to a point 162 in the stop 38. Also mounted in the stop 38 is a light source 164, which projects light either along a bore 165 or a waveguide to an exit point 166 opposite the point 162. When a part reaches the position of 12a in FIG. 13, it will block the light exiting the port 166 so that it will not be received at the point 162. The sensor 160 will then indicate the presence of the part on the stop 38. When the part 12a has been removed, light will be received by the sensor 160 to provide a signal that there is no part on the stop. In response to this signal and signals from other appropriate sensors, which may also be optical sensors, the control unit 154 will control the actuation of the valves 152 and 153 to cause reciprocation of the pistons or rods 42 and 43 and, thus, control the escapement of the parts from positions 12b and 12c into positions 12a and 12b.

In the device illustrated in FIG. 6, it has been described as the belts moving from right to left so that the exit end is at the left end, which is opposite to the end having all the drive pulleys for the various belts. It is possible to reverse the direction of movement for the motor and reverse the mounting of the hold-down means, such as the bar 40, so that the exit end could be on the right-hand end adjacent the pulleys 72 instead of adjacent the pulleys 70.

Although various minor modifications may be suggested by those versed in the art, it should be understood that I wish to embody within the scope of the patent granted hereon all such modifications as reasonably and properly come within the scope of my contribution to the art.

I claim:

1. A device for conveying articles from an input end to an output end with a continuous orientation along a center line as a column of articles, said device comprising a main frame, at least one pair of continuous belts having contact surfaces, first means for mounting said pair of continuous belts in the main frame with an adjustable spacing therebetween relative to said center line, drive means for driving the belts at the continuous speed, second means for guiding articles being carried by said belts to move along the center line, said second means being adjustable relative to said belts and center line, said second means coacting with the first means to control the amount of conveying force being transferred between the pair of belts to each of said articles, third means for holding the articles in a single layer in said column on said pair of belts, fourth means for holding an article at the exit end in an exit position, and fifth means for releasing one article at a time from a leading end of the column of articles to be carried by the belts to said exit position while retaining the remaining articles of the column in a position spaced from said exit position.

2. A device according to claim 1, wherein the first means includes a pair of unit frame members, with each unit frame member supporting pulleys for a belt associated therewith, a pair of threaded members, each threaded member having both right-handed threads and left-handed threads and means for rotating both the threaded members simultaneously with the same amount and in the same direction to shift each of the unit frame members relative to said center line to shift the belts laterally relative to said center line.

3. A device according to claim 2, wherein each of the second means comprises a guide element mounted for lateral movement on each of the unit frame members, said elements being moved from a position substantially covering the entire surface of each belt to a position completely retracted from covering the belt.

4. A device according to claim 3, wherein the third means comprises a hold-down bar secured to a main frame member of the said main frame to be positioned on the center line between the pair of belts.

5. A device according to claim 4, wherein the hold-down bar is adjustably mounted on said main frame member to vary the spacing between the hold-down surface and a plane of the contact surfaces.

6. A device according to claim 5, wherein the main frame member is pivotably mounted to the main frame to allow pivoting the hold-down bar from a position disposed on the center line to a withdrawn position.

7. A device according to claim 6, wherein the fifth means is mounted on the end of the hold-down bar adjacent the exit end of the device.

8. A device according to claim 1, wherein the third means comprises a hold-down bar mounted on a frame member, said frame member being pivotable from a first position with the hold-down bar spaced from the contact surfaces of the belt to a retracted position with the hold-down bar removed therefrom to gain access to the surfaces of said belts.

9. A device according to claim 8, wherein the hold-down bar is adjustably mounted on said frame member to enable varying the distance between the hold-down surface and the contact surface.

10. A device according to claim 8, wherein the fifth means is mounted on the end of the hold-down bar adjacent the exit end of the device.

11. A device according to claim 1, wherein the fourth means comprises a plate extending across the ends of the pair of belts, said plate having sensing means for sensing the presence of a part engaging said plate.

12. A device according to claim 1, wherein the first means includes a sub-frame for each pair of belts, each sub-frame having a separate frame member for supporting a belt of each pair, said first means including means for shifting each frame member and its respective belt towards the center line between the pair of belts by an equal amount to adjust the spacing between the edges of the belts.

13. A device according to claim 12, wherein the means for shifting the frame members and belts includes a pair of threaded members, each threaded member having right-hand threads and left-hand threads, with the right hand threads being engaged in one of the pairs of sub-frame members and the left-hand threads being engaged in the other so that rotation of each threaded member in the same direction by the same amount moves the belts the same distance to create adjustment in the spacing therebetween.

14. A device according to claim 13, which includes a pulley on each of said threaded members and a toothed belt extending between said pulleys so that rotation of one member causes rotation of the other threaded member in the same direction and with the same amount.

15. A device according to claim 1, which includes at least two pairs of belts, said first means mounting said pairs of belts to extend parallel to each other and side-by-side in said main frame.

16. A device according to claim 15, wherein the first means includes a separate sub-frame for each pair of belts, each sub-frame having a pair of separate frame members for supporting the pair of belts, said first means including means for shifting the pair of frame members and their respective belts towards a center line between the pair of belts by an equal amount to adjust the spacing between the edges of the belts.

17. A device according to claim 16, wherein said means for shifting moves the pair of frame members of each sub-frame the same amount and in the same direction so that the spacing between the pair of belts in each pair of belts is the same.

18. a device for conveying articles along a center line from an input end to an output end with a continuous orientation as a column of articles, said device comprising a frame, at least one pair of continuous belts having contact surfaces, first means for mounting said pair of continuous belts in the frame with an adjustable spacing therebetween relative to the center line, drive means for driving the belts at a continuous speed, second means for guiding articles being carried by said belts, said second means including a guide member for each belt being adjustably mounted to cover a lateral portion of the belt to limit the amount of lateral width of the belt being exposed for conveying articles, said first means and said second means coacting together to control the amount of the belt surfaces engaging the article to control the amount of conveying force being transferred between the pair of belts to each of said articles, third means including a hold-down bar for holding the articles in a single layer in said column on said pair of belts, fourth means for holding an article at the exit end in an exit position, and fifth means for releasing one article at a time from the leading end of the column of articles to be carried by the belts to said exit position while retaining the remaining articles of the column in a position spaced from said exit position.

19. A device according to claim 18, wherein the fourth means comprises a plate extending across the ends of the pair of belts, said plate having sensing means for sensing the presence of a part engaging said plate.

* * * * *